United States Patent [19]
Enos et al.

[11] 3,940,639
[45] Feb. 24, 1976

[54] MHD GENERATOR WITH UNIFORM VOLTAGE DISTRIBUTION

[75] Inventors: George R. Enos, Concord, N.H.; Richard J. Rosa, Cambridge; Stanley W. Petty, Boxford, both of Mass.

[73] Assignee: Avco Everett Research Laboratory, Inc., Everett, Mass.

[22] Filed: Feb. 15, 1974

[21] Appl. No.: 442,800

[52] U.S. Cl. ............................................. 310/11
[51] Int. Cl. ........................................... H02n 4/02
[58] Field of Search ......................... 310/11; 322/7

[56] References Cited
UNITED STATES PATENTS

| | | |
|---|---|---|
| 3,149,247 | 9/1964 | Cobine et al. ............... 310/11 |
| 3,182,213 | 5/1965 | Rosa ............................ 310/11 |
| 3,183,380 | 5/1965 | Hurwitz, Jr. et al. ........ 310/11 |
| 3,524,086 | 8/1970 | Lindley ....................... 310/11 |
| 3,792,340 | 2/1974 | Sheinkman et al. ......... 322/7 |

*Primary Examiner*—Donovan F. Duggan
*Attorney, Agent, or Firm*—Charles M. Hogan; Melvin E. Frederick

[57] ABSTRACT

An MHD generator includes external electrical connectors between adjacent discrete electrodes in one wall of the generator duct, which has opposed electrodes which may lie in a plane at an angle to the direction of gas flow. The electrical connection includes a circuit which adjusts the voltage between the connected adjacent electrodes to insure that the Hall voltage differential between the discrete electrodes which are adjacent to each other in the same wall of the duct does not exceed the damaging breakdown voltage. Indicator means when coupled to the circuits in accordance with the invention comprise diagnostic means which provide a graphic representation of voltage distribution along the length of the generator duct.

4 Claims, 5 Drawing Figures

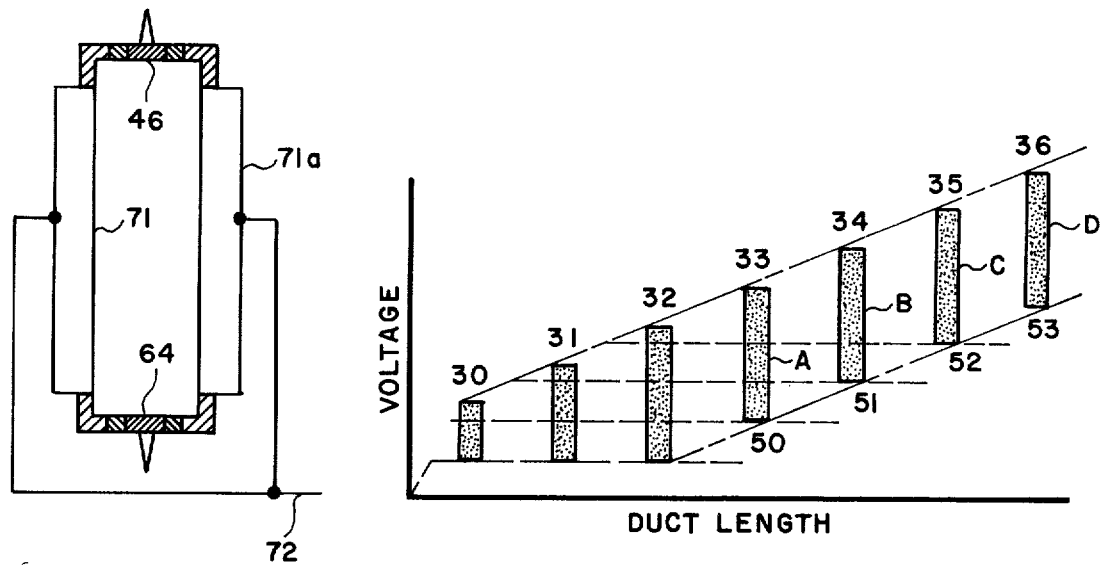
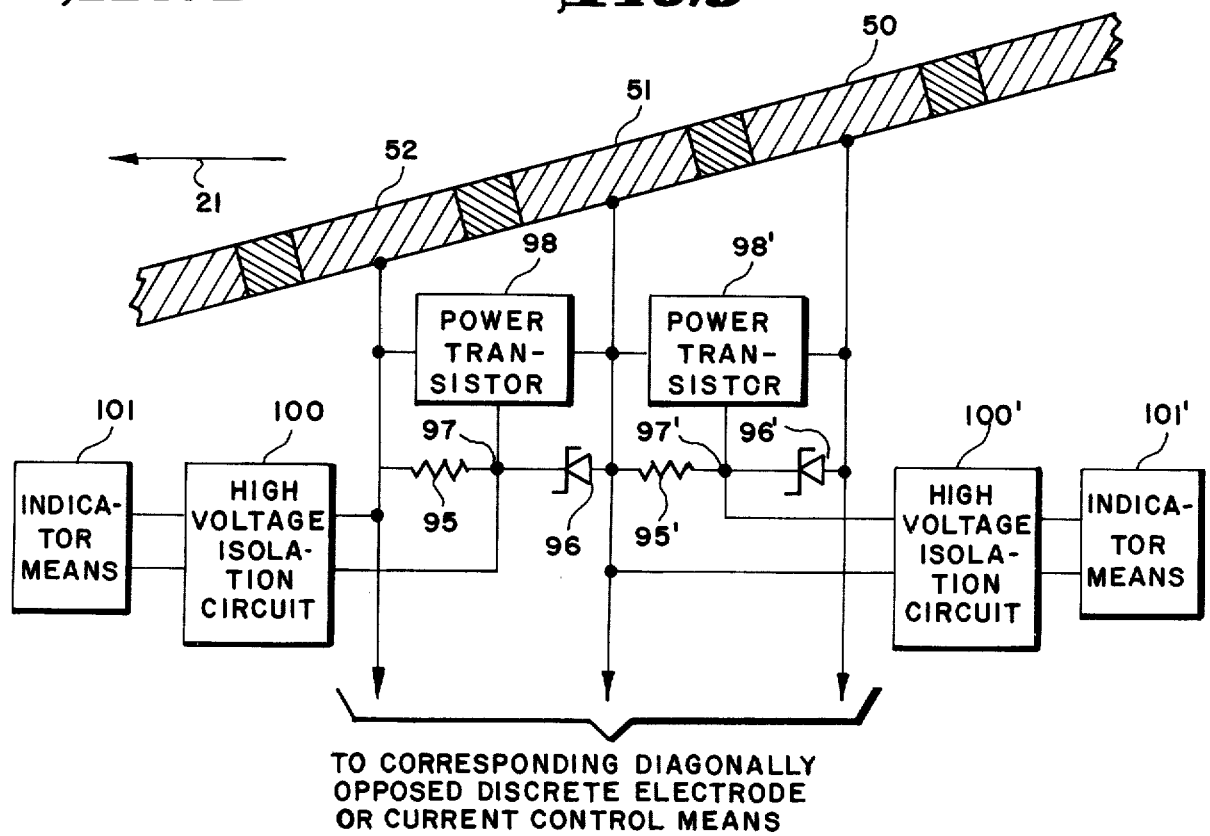

MHD GENERATOR WITH UNIFORM VOLTAGE DISTRIBUTION

BACKGROUND OF THE INVENTION

The present invention relates to magnetohydrodynamic (hereinafter abbreviated "MHD") generators, and more particularly to such generators that employ either the Hall or diagonal method of connection.

In general terms, MHD generators produce electric power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source.

Several different gases may be used, for example, the gas may simply be air, or may comprise inert gases, such as helium or argon. To promote electrical conductivity, the gases are heated to high temperature and may be seeded with a substance that ionizes readily at the operating temperature of the generator. For seeding purposes, sodium, potassium, cesium or an alkali metal vapor may be used. Regardless of the gas used and the manner of seeding, the resulting gases comprise a mixture of electrons, positive ions and neutral atoms which, for convenience, may be termed "plasma."

In the conventional MHD generator, the plasma flows through a magnetic field, which is directed perpendicular to the direction of plasma flow. The movement of the electrically conductive plasma relative to the field produces an E.M.F. that is normal both to the direction of flow of the plasma and the magnetic field, the current flowing transversely of the field between opposed electrodes at the sides of the generator. In such a generator, a separation of positive and negative electrical charges occurs along the length of the plasma stream, producing a potential gradient, known as the "Hall potential," which promotes longitudinal circulation of current internally of the generator. In a conventional MHD generator, such longitudinal currents cause energy losses which are detrimental to the operation of the generator and various schemes have been devised to prevent their formation. It is possible, however, to build an MHD generator that takes advantage of the Hall potential, as in the so-called "Hall current generator" and the so-called "diagonal generator."

The Hall current generator comprises a duct and a magnetic field normal to the axis of the duct. Movement of plasma through the duct and the field induces an electromotive force between numerous pairs of opposed discrete electrodes that are interconnected to accommodate circulation of current transversely of both the magnetic field and the direction of plasma flow. The terminal electrodes, i.e., the first and last electrodes along the length of the duct, are connected to an external load, making possible circulation of Hall current longitudinally through the plasma and the load circuit. Oppositely disposed electrodes intermediate the terminal electrodes are interconnected to provide the aforementioned transverse circulation of current. The arrangement of elements is quite simple and effective.

The diagonally connected generator is somewhat more complex, but more efficient than the Hall generator. Its operation may be explained as follows: Movement of the electrically conductive plasma past each pair of opposed discrete electrodes generates a potential gradient in the plasma therebetween. Assuming that the velocity of the plasma and the magnetic field strength are constant the length of the duct, then the potential difference established transverse of the duct between any given pair of opposed electrodes is substantially constant; however, because of the Hall potential existing longitudinally of the duct, the mean potential of the last pair of electrodes is at a more positive level than that of the first pair of electrodes. Thus, the mean potential of any given pair of opposed electrodes is more positive than the mean potential of opposed electrodes that are upstream thereof.

By suitable spacing of the electrodes along the duct, it is possible, under ideal circumstances to make the potential of staggered, opposed electrodes the same. Since these electrodes are at the same potential, they may be electrically interconnected. A structure such as this with the diagonally opposed electrodes interconnected is described in U.S. Pat. No. 3,148,291, which issued Sept. 8, 1964. In this structure, it will be noted that the power generated by each pair of opposed electrodes is added to the power of all other pairs of electrodes and supplied to the terminal electrodes. Thus, a generator of the type described not only is able to deliver power at high voltage, but substantial amounts of power to a common load.

One problem that arises with the Hall generator and also the "diagonally connected MHD generator" is that there is a tendency for the current flowing in the gas to flow preferentially to some electrodes and not to others due, for example, to random variations in their surface properties or structure. This can lead to concentrations of Hall voltage between certain electrodes and lead to damaging breakdown—especially on the anode wall.

SUMMARY OF THE INVENTION

In view of the foregoing, it will be apparent that a broad object of the invention is to provide an improved MHD generator of the Hall or diagonal type.

Another object is to provide an MHD generator of the Hall or diagonal type having intermediate the terminal electrodes, adjacent electrodes that are so interconnected in pairs such that there is a tendency toward uniform distribution of the Hall voltage along the generator duct.

Still another object of the invention is the provision of an MHD generator of the Hall or diagonal current type that is capable of producing electric power at high voltage with great efficiency.

Still another object of the invention is to provide an MHD generator having opposed sets of electrodes that are interconnected in such fashion that the output from the generator represents the aggregate output of the individual sets of electrodes.

Still another object of the invention is the provision of an MHD generator of the Hall or a diagonal current type having means to control the voltage between adjacent electrodes to insure that the Hall voltage difference between adjacent electrodes does not reach breakdown level and which may provide a graphic representation of voltage distribution along the length of the duct for diagnostic purposes and the like.

Other objects of the invention are to provide a generator characterized by: A moving stream of electrically conductive gas in a duct having an inlet and an outlet, a magnetic field normal to the direction of gas flow, terminal electrodes in the duct at the inlet and outlet, a plurality of discrete electrodes at intervals along opposing walls of the duct, pairs of said opposing electrodes lying in planes which are generally parallel and at an angle $\theta$ to the direction of the gas stream and means in circuit with adjacent electrodes providing sufficient adjustment of the voltage between these electrodes to insure that the Hall voltage difference between them does not reach breakdown level.

In one embodiment of the present invention, a passive resistor, or preferably an active circuit element, is coupled between adjacent electrodes. The value of this active circuit element is such that only a few percent of the power flow in an electrode is lost. The active circuit element such as an SCR or a transistor is used to control the Hall voltage difference between adjacent electrodes.

In a further embodiment, the active circuit element coupled between the electrodes may be such as to provide an indication of current flow in the electrodes and/or utilized to actuate indicator means providing a graphic representation of voltage distribution along the length of the duct.

Other objects and features of the present invention are understood from the description herein of the specific embodiments which represent the best-known uses of the invention. These embodiments are described herein in conjunction with the following figures:

DESCRIPTION OF THE FIGURES

FIG. 2 is a cross sectional view of the generator shown in FIG. 1 taken on plane 2—2 of FIG. 1;

FIG. 3 is a graph illustrating ideal and typical actual voltage conditions within the generator;

FIG. 4 is an electrical diagram showing an electrical circuit between adjacent electrodes for controlling the voltage between adjacent electrodes.

DESCRIPTION OF EMBODIMENTS OF THE INVENTION

In an MHD generator the gas moving through the generator duct is a slightly ionized plasma having a substantially equal number of positive ions and electrons. Since the electrons are very much lighter than the ions, they have far greater mobility in an electron field and carry the great majority of the current. The current flow between opposed electrodes is thus due almost entirely to electron flow. The drift velocity of the electrons is given by the following equation:

$$V_e = \frac{j}{N_e e} \tag{1}$$

where:

$j$ = current density
$N_e$ = electron density
$e$ = electron charge

Figure 1:
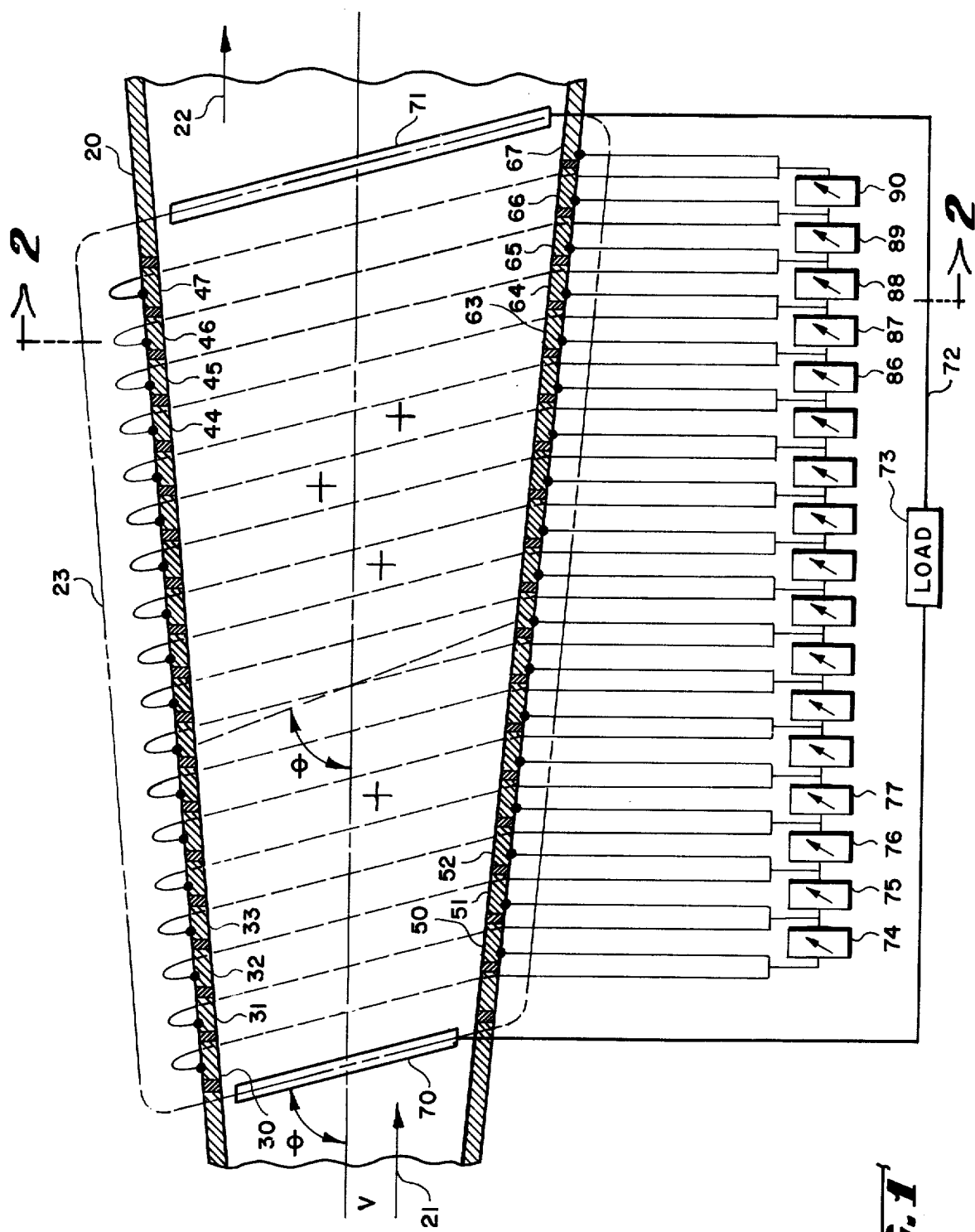
FIG. 1 is a schematic longitudinal sectional view of an MHD diagonally connected generator embodying one of the novel principles of this invention.

It should be noted, however, that the drift velocity of the electrons is perpendicular to the magnetic field B. This causes an electric field (known as the "Hall field" $E_H$) to be induced along the length of the duct. This field may be calculated from the following equation:

$$E_H = V e B = \frac{j}{N_e e} = \omega \tau V B (1-\alpha) \tag{2}$$

where:

$\omega$ = electron cyclotron velocity
$\tau$ = mean electron collision time
$\alpha = E/VB$ (non-dimensional)
$E$ = electric field between electrodes Directing attention now to FIG. 1, the gas velocity is again designated V and the magnetic field is designated B. The VXB potential gradient is induced as a result of the gas movement through the field. This results in an electric field E between the directly opposed electrodes. However, the Hall field $E_H$ is directed along the axis of the gas stream in a direction opposite to its movement. The resulting electric field E is thus directed at an angle to the direction of movement of the gas stream.

For gases of practical interest for use in MHD generators, the Hall field can be quite large, equal sometimes to two to three times the size of VXB.

The MHD generator described in U.S. Pat. No. 3,148,291 includes a tapered duct. Along the top and bottom of the duct are provided pluralities of discrete electrodes. Adjacent the entrance and exit of the duct are opposed pairs of terminal electrodes which are connected by conductors to a load. Furthermore, diagonally opposed electrodes are electrically interconnected such that the ends of each interconnected pair of electrodes lie within a plane at an angle $\theta$ to the stream of plasma flowing through the duct. The angular position of these planes and the angular positions of the terminal electrodes are the same. Ideally, the Hall voltage at two of the diagonally opposed electrodes is the same and so the direct interconnection is possible.

Directing attention to FIG. 1, it will be noted that the generator comprises a duct, generally designated 20 to which high temperature, high pressure, electrically conductive plasma is introduced, as indicated by arrow 21, and from which it exhausts as indicated by the arrow 22. Adjacent the exterior of the duct is a continuous electrical conductor in the form of a coil 23 to which current may be supplied from any conventional source or from the generator itself. Flow of current in the coil provides a magnetic flux through the duct perpendicular to the plane of the paper.

Along the top and bottom of the duct are provided pluralities of discrete electrodes 30–45 and 50–65, respectively. Adjacent the entrance and exit of the duct are opposed pairs of terminal electrodes, one of each pair being shown at 70 and 71, respectively. These terminal electrodes are connected by conductor 72 to a load 73.

Diagonally opposed electrodes are electrically interconnected. For example, upper electrode 30 is electrically connected to lower electrode 50. Similarly, corresponding diagonally opposed discrete electrodes 31 and 51, 32 and 52, etc. are interconnected. Each such an interconnected pair of electrodes lie within a plane at the angle $\theta$ to the stream of plasma flowing through the duct. The angular position of these planes and the angular positions of the terminal electrodes 70 and 71 are discussed fully in U.S. Pat. No. 3,148,291 and U.S. Pat. No. 3,324,318.

Impedances 74–89 are connected between adjacent electrodes. Thus, as illustrated in FIG. 1, impedance 74 is connected between adjacent lower electrodes 50–51, impedance 75 between adjacent lower electrodes 51–52, etc.

It is to be noted that whereas in the diagonally connected generator, the interconnected electrodes lie in planes at an angle $\theta$ as illustrated in FIG. 1, of less than 90°, in the Hall generator, the circulation of current in the duct is transverse to the duct axis (transverse to both the magnetic field and direction of plasma flow) and is made so by interconnecting directly opposed electrodes. Thus, in the special case of the Hall generator, the angle $\theta$ is 90°, whereas otherwise it is less than 90°.

As shown in FIG. 2, the duct may be generally rectangular in cross section and the terminal electrode 71 is electrically interconnected with its opposed terminal electrode 71a in the opposite wall of the duct. As is the case with the electrodes 30–45 and 50–65, all of the terminal electrodes are electrically insulated from the duct.

Because of the Hall potential existing longitudinally of the duct, electrons from the plasma stream will enter terminal electrode 70 and its opposed terminal electrode (not illustrated), flow through the load circuit to the terminal electrodes 71 and 71a, and re-enter the plasma stream from these latter electrodes. Because of this electron movement, the upstream terminal electrodes may be regarded as anodes, and the downstream terminal electrodes as cathodes. The discrete electrodes 50–65 serve as anodes and electrodes 30–45 as cathodes. With regard to the discrete electrodes, electrons will be emitted by the electrodes (cathodes) 30–45 and will be received from the gas stream by electrodes (anodes) 50–65. Consistent with the foregoing designations, the magnetic field should be established perpendicular to the direction of plasma flow and perpendicularly into the plane of the paper. The magnetic field is designated in FIG. 1 by the plus signs, indicating flux lines directed into the plane of the paper.

Movement of electrically conductive plasma past each pair of directly opposed electrodes generates a potential gradient in the plasma therebetween which is proportional to the cross product of the velocity of the gas and the magnetic field strength. Under the influence of this potential, an electron current flows between the electrodes.

If it could be assumed that the velocity of the plasma and magnetic field strength are constant throughout the length of the duct and that there is no tendency for the current flowing in the gas to flow preferentially to some electrodes and not to others due to random variations in their surface properties or structure, then the potential difference established transverse of the duct between any given pair or opposed electrodes would be substantially constant. Furthermore, because of the Hall potential existing longitudinally of the duct, the mean potential of the last pair of electrodes is at a more positive level than that of the first pair of electrodes. Thus, the mean potential of any given pair of opposed electrodes is more positive than the mean potential of opposed electrodes that are upstream thereof.

This is illustrated by FIG. 3 which shows in graphical form the potential difference in the plasma stream existing between successive pairs of opposed electrodes in this ideal case. The bar graph A shows the potential difference between electrodes 33 and 50, the potential associated with the electrodes being indicated by the reference numbers of the electrodes at the ends of the bar graph. Similarly, with respect to bar graphs B-D which illustrate the potential difference between opposed electrodes 34–51, 35–52 and 36–53.

By suitable spacing of the electrodes along the duct, it is possible to make the potential of the staggered, opposed electrodes the same in this ideal case and so the diagonally opposed electrodes can be directly connected to each other as in U.S. Pat. No. 3,148,291. However, in a typical MHD Hall generator or diagonally connected generator, there is a tendency for the current flowing in the gas to flow preferentially to some electrodes and not to others due to various factors such as random variations in their surface properties or structure. This can lead to concentrations of Hall voltage between some adjacent electrodes and lead to damaging breakdown—especially on the anode wall. A solution to this problem, set forth in, and hereby incorporated by reference, in patent application Ser. No. 442,802, filed Feb. 18, 1974, in the names of R. J. Rosa, G. R. Enos and S. W. Petty, and assigned to the same Assignee as this patent application, is to provide an impedance in series with each electrode. The size of this impedance is such that the rated current through it produces a voltage drop comparable to the rated Hall voltage per electrode. The power lost in the impedance need not be large, the fraction being approximately the Hall voltage per electrode $\div \mu$ BD. Here, D is the distance from center to center between adjacent discrete electrodes in the wall of the duct, $\mu$ is the macroscopic plasma velocity and B is the magnetic field strength. In a typical case where, for example, the Hall voltage per electrode is 40 volts, $\mu$ is 2,000 meters per second, B is 3.0 webers/meter$^2$ and D is 0.2 meters, this fraction is only 0.033 or 3.3% of the Hall voltage per electrode. Generally, the larger the generator, the smaller this fraction becomes.

The impedances connecting the diagonally opposed electrodes may be dc resistors of predetermined values. Each of these resistors may be adjusted during a test under operating conditions to provide the desired voltage differential between adjacent discrete electrodes. Alternately and preferably for purposes of convenience and efficiency, the impedances are variable.

As an alternate structure, the impedances may each be an active circuit. Such an active circuit between diagonally opposed discrete electrodes produces a voltage drop sufficient to limit the current to each electrode to a predetermined value, i.e., it acts as a current limiter. So long as the current is normal, the voltage drop of the current is small and, hence, so is the power dissipated. In this respect, it is superior to the simple resistor.

Such an active circuit may include a conventional current sensor in the connecting line between diagonally opposed electrodes. The output of the current sensor is a signal representative of the current between the connected diagonally opposed electrodes. This signal may be applied to the input of conventional control circuit which is effective to control the gain of a power transistor or the like connected in series with the current sensor. High voltage isolation means such as, for example, a photodiode optoisolator Model MCD-1 manufactured by Monsanto Commercial Products of Cupertino, Calif. may be provided intermediate the current sensor circuit and the control circuit to provide a signal proportional to the current flowing in line 92 and, hence, the current flowing between electrodes 30 and 50. The isolation means provides an output signal to suitable indicator means which provides an indication of the magnitude of current flow between electrodes 30 and 50.

The present invention seeks to directly adjust the voltage between adjacent discrete electrodes rather than control current flow as described above. In accordance with the present invention, the diagonally opposed electrodes may be directly connected as in the generator described in said U.S. Pat. No. 3,148,291 or may contain the series resistor or active circuit described above. However, an additional active circuit such as shown in FIG. 4 is connected between each adjacent discrete electrode. This circuit includes a resistor 95 in series with a Zener diode 96 between the adjacent electrodes such as electrodes 51 and 52. The control voltage at point 97 between the resistor and Zener diode controls a power transistor 98 between the electrodes. Any tendency for the Hall voltage between these electrodes to exceed a limit determined by the resistor and diode, controls the power transistor to oppose the tendency.

High voltage isolation means 100 are coupled across resistor 95 to provide a signal to suitable indicator means 101 as and for the purposes discussed in connection with the current limiting technique. Whereas in accordance with the current limiting technique, signals are derived and utilized to provide an indication to a plant operator or the like of current distribution, the current limiting device, for example, may for some applications comprise a lamp located on a display panel and/or comprise part of the voltage control circuits between adjacent electrodes. Thus, with such lamps or the like arranged sequentially on a display panel, such series connected lamps may, in addition to controlling electrode current, provide a plant operator with a graphic picture of the current distribution throughout the length of the generator duct while lamps in voltage control circuits indicate which of these circuits, if any, are firing.

In either of the above cases, irregularity in the distribution of luminosity will alert the operator to the existence of trouble and/or give him a quick insight into potential trouble spots.

Figure 5:
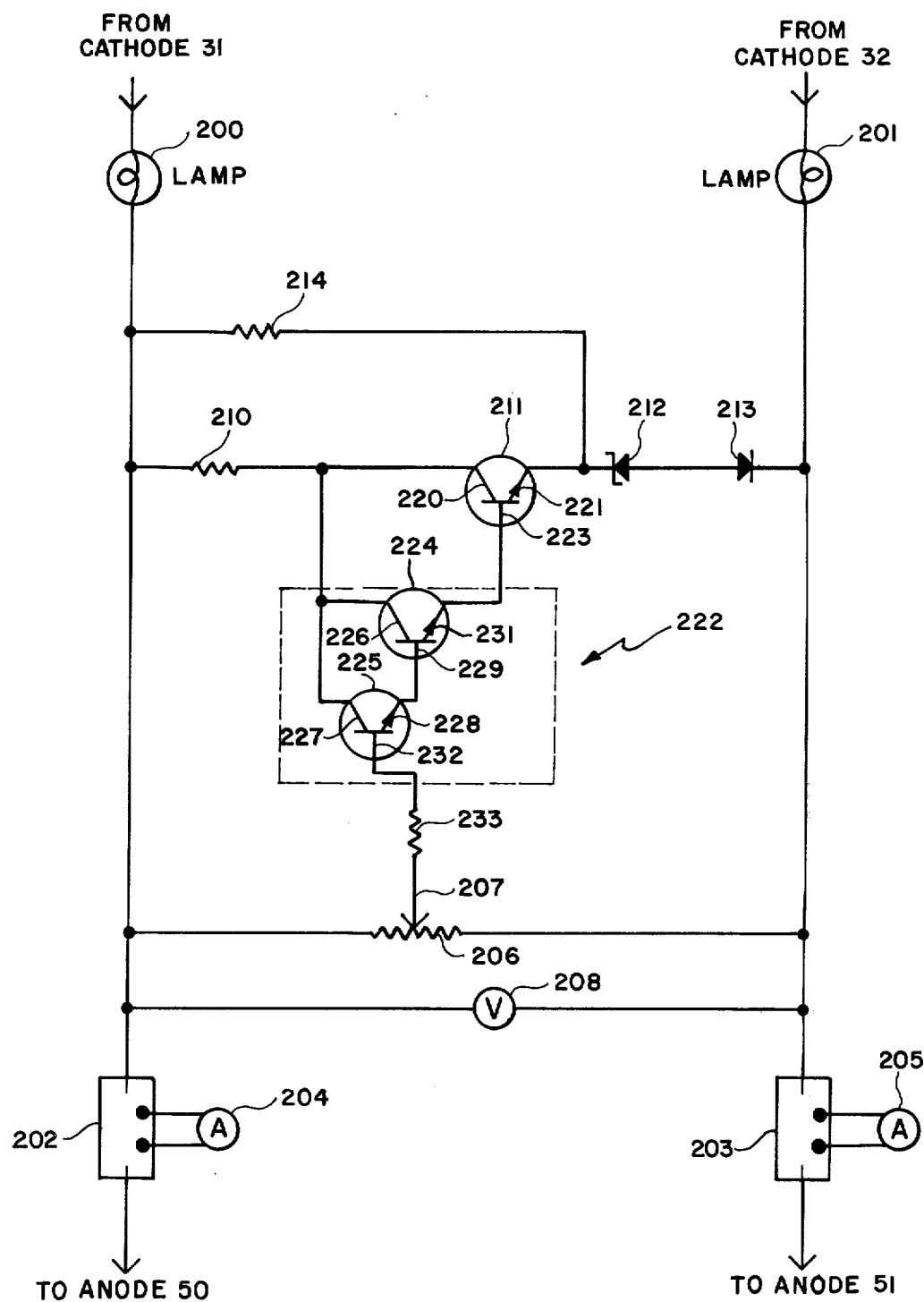
FIG. 5 is an electrical schematic diagram showing details of an electrical circuit for controlling the voltage between adjacent electrodes.

Directing attention now to FIG. 5, there is shown details of a modified active circuit in accordance with the invention. Shown in FIG. 5 are current limiting devices such as lamps 200 and 201 each connected in series with a cathode electrode for the purpose of limiting current flow as previously pointed out. Also shown coupled to the electrode circuits are isolation circuit means 202 and 203 together with their associated indicating devices such as, for example, ammeters 204 and 205. A variable sensing resistor or potentiometer 206 having a variable arm 207 and an indicating volt meeter 208 are each connected between adjacent anodes as shown in FIG. 5. Further connected between and coupling adjacent electrodes and comprising an active circuit for controlling the voltage between the aforementioned adjacent electrodes is series connected ballast resistor 210, power transistor 211, zener diode 212 and blocking diode 213. Resistor 214 is connected across the ballast resistor 210 and the power transistor 211. The ballast resistor 210 is connected to the collector electrode 220 and the zener diode 212 is connected to the emitter electrode 221 of the power transistor 211. A control circuit designated generally by the numeral 222 is coupled between the collector electrode 220 and base electrode 223 of the power transistor and the variable arm 207 of sensing resistor 206 to provide rapid turn-on of the power transistor. The control circuit 222 may comprise as shown by way of example in FIG. 5, a pair of transistors 224 and 225 having their collector electrodes 226 and 227 interconnected and connected to the collector electrode 220 of the power transistor. The emitter electrode 228 of transistor 225 is connected to the base electrode 229 of transistor 224, the emitter electrode 231 of which is connected to the base electrode 223 of the power transistor. The base electrode 232 of transistor 225 is connected through resistor 233 to the variable arm 207 of sensing resistor 206.

The voltage between adjacent electrodes can be controlled by the circuit shown in FIG. 5. When the voltage between adjacent electrodes such as, for example, anodes 50 and 51, reaches the maximum desired value, the power transistor 211 is turned on so that current flows from anode 50 to anode 51 through ballast resistor 210. This current flow prohibits a further buildup of voltage between the anodes 50 and 51. The voltage at which the power transistor 211 turns on is determined by the value of the zener diode 212 and the setting of the sensing resistor 206. The control circuit 222 permits the rapid turn-on of the power transistor and the blocking diode 213 prevents damage to the power transistor in the event a reversal of voltage develops between electrodes.

The embodiments of the present invention representing the best known uses of the invention all serve to control the current to each electrode and/or the voltage between adjacent discrete electrodes in the duct wall of an MHD type Hall or diagonal generator. Even while following the teachings of this invention, variations and modifications will occur to those skilled in the art without departing from the spirit and scope of the invention as set forth in the following claims:

What is claimed is:

1. An MHD generator for generating electricity from a moving stream of electrically conductive gas comprising:
   a duct for conveying the gas stream, the duct having an inlet and an outlet,
   means for establishing a magnetic field through said duct normal to the direction of gas flow,
   terminal electrodes positioned along the duct at the inlet and outlet,
   a plurality of discrete electrodes positioned at intervals along opposing walls of the duct,
   certain of said discrete electrodes being directly opposed and lying in planes normal to the direction of gas flow, said generator having a rated Hall voltage between adjacent electrodes,
   a plurality of first coupling means each coupling together different opposed discrete electrodes which lie in planes at an angle $\theta$ to the direction of gas flow,
   second coupling means including a power transistor connected between and coupling together different adjacent electrodes for producing a voltage drop between said connected adjacent discrete electrodes sufficient to prevent damaging electrical differentials between said adjacent discrete electrodes, and a control circuit for controlling the current flow through said transistor in response to the voltage across said transistor.

2. An MHD generator as in claim 1 wherein, the coupling means includes a series circuit connected between said adjacent electrodes comprising a ballast resistor in series with a power transistor, a zener diode in series with said power transistor, and a blocking diode in series with said zener diode, a potentiometer with a variable arm, said potentiometer being connected between said adjacent electrodes, and a control circuit coupled between said power transistor and the variable arm of said potentiometer for effecting rapid turn-on of said power transistor, the setting of said variable arm and said zener diode controlling said power transistor for determining the voltage at which it begins conducting, and said blocking diode protecting said power transistor from a reversal of voltage across it.

3. An MHD generator as in claim 1 and additionally including, means for providing a signal proportional to current flow through said second coupling means, and indicator means actuated by said signal for providing an indication proportional to current flow.

4. An MHD generator as in claim 1 wherein, the first and second coupling means include impedances, said first means impedances providing a voltage drop that is a fraction of said rated Hall voltage between adjacent electrodes, and said second means impedances providing a voltage drop whereby the voltage differential between adjacent electrodes is maintained substantially constant along the duct.

* * * * *